United States Patent
Noda et al.

(10) Patent No.: US 10,193,161 B2
(45) Date of Patent: Jan. 29, 2019

(54) ANODE FOR SOLID OXIDE FUEL CELL AND PRODUCTION METHOD THEREFOR, AND METHOD FOR PRODUCING ELECTROLYTE LAYER-ELECTRODE ASSEMBLY FOR FUEL CELL

(71) Applicant: SUMITOMO ELECTRIC INDUSTRIES, LTD., Osaka-shi, Osaka (JP)

(72) Inventors: Yohei Noda, Itami (JP); Masatoshi Majima, Itami (JP); Hiromasa Tawarayama, Itami (JP); Naho Mizuhara, Itami (JP); Chihiro Hiraiwa, Itami (JP); Takahiro Higashino, Itami (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 81 days.

(21) Appl. No.: 15/526,831

(22) PCT Filed: Jul. 21, 2015

(86) PCT No.: PCT/JP2015/070647
§ 371 (c)(1),
(2) Date: May 15, 2017

(87) PCT Pub. No.: WO2016/080019
PCT Pub. Date: May 26, 2016

(65) Prior Publication Data
US 2017/0373324 A1    Dec. 28, 2017

(30) Foreign Application Priority Data
Nov. 21, 2014    (JP) .................. 2014-236434

(51) Int. Cl.
*H01M 4/88* (2006.01)
*H01M 8/12* (2016.01)
(Continued)

(52) U.S. Cl.
CPC .......... *H01M 4/8875* (2013.01); *H01M 4/86* (2013.01); *H01M 4/88* (2013.01); *H01M 4/8885* (2013.01);
(Continued)

(58) Field of Classification Search
None
See application file for complete search history.

(56) References Cited

U.S. PATENT DOCUMENTS
2013/0095408 A1    4/2013    Jung et al.

FOREIGN PATENT DOCUMENTS
EP    0 763 864 A1    3/1997
JP    2015-046251 A    3/2015

OTHER PUBLICATIONS

Karczewski et al; Solid oxide fuel cells with Ni-infiltrated perovskite anode; Solid State Ionics; 221; Jun. 30, 2012; pp. 11-14.*
(Continued)

*Primary Examiner* — Sarah A. Slifka
(74) *Attorney, Agent, or Firm* — Drinker Biddle & Reath LLP (57) ABSTRACT

A method for producing an anode capable of increasing output of a solid oxide fuel cell is provided. The method for producing an anode for a solid oxide fuel cell includes a first step of shaping a mixture that contains a perovskite oxide having proton conductivity and a nickel compound and a second step of firing a shaped product, which has been obtained in the first step, in an atmosphere containing 50% by volume or more of oxygen at 1100° C. to 1350° C. so as to generate an anode.

7 Claims, 3 Drawing Sheets

(51) Int. Cl.
H01M 4/86 (2006.01)
H01M 8/02 (2016.01)
H01M 4/90 (2006.01)
H01M 8/124 (2016.01)

(52) U.S. Cl.
CPC .......... *H01M 4/9033* (2013.01); *H01M 8/02* (2013.01); *H01M 8/12* (2013.01); *H01M 2008/1293* (2013.01); *Y02P 70/56* (2015.11)

(56) References Cited

OTHER PUBLICATIONS

Youmin Guo et al., "Zirconium doping effect on the performance of proton-conducting $BaZr_yCe_{0.8-y}Y_{0.2}O_{3-\delta}$ ($0.0 \leq y \leq 0.8$) for fuel cell applications," 2009, pp. 400-407, Journal of Power Sources 193.

Gilles Taillades, et al., "Engineering of porosity, microstructure and electrical properties of $Ni$—$BaCe_{0.9}Y_{0.1}O_{2.95}$ cermet fuel cell electrodes by gelled starch porogen processing" Microporous and Mesoporous Materials, 145 (2011), pp. 26-31.

\* cited by examiner

ANODE FOR SOLID OXIDE FUEL CELL AND PRODUCTION METHOD THEREFOR, AND METHOD FOR PRODUCING ELECTROLYTE LAYER-ELECTRODE ASSEMBLY FOR FUEL CELL

TECHNICAL FIELD

The present invention relates to anodes used in solid oxide fuel cells and in particular to an improvement on an anode production method.

BACKGROUND ART

Perovskite oxides having proton conductivity exhibit high conductivity in an intermediate temperature range and are a prospective material for solid electrolytes of intermediate temperature fuel cells. In order to sinter a perovskite oxide to form a solid electrolyte, a heat treatment at high temperature is required.

An anode (fuel electrode) of a solid oxide fuel cell contains a Ni component that serves as a catalyst and further contains a solid electrolyte in order to suppress aggregation of particles of the Ni component and adjust thermal expansion coefficient. An anode containing a solid electrolyte and a Ni component is typically formed by mixing a solid electrolyte and nickel oxide and co-sintering the resulting mixture.

Non-Patent Literature 1 describes firing a pellet, which contains NiO and $BaZr_yCe_{0.8-y}Y_{0.2}O_{3-\delta}$, in air at 1450° C. for 5 hours.

CITATION LIST

Non Patent Literature

NPL 1: Journal of Power Sources 193 (2009) pp 400-407

SUMMARY OF INVENTION

Technical Problem

However, when a perovskite oxide is used in the anode and co-sintering is performed at high temperature as described in Non-Patent Literature 1, aggregation of nickel oxide proceeds. As the particle size of nickel oxide increases due to aggregation, the triple phase boundary in the anode decreases, the reaction resistance increases, and high output is no longer obtained. In contrast, if the temperature of co-sintering is lowered to suppress aggregation of nickel oxide, sintering of the perovskite oxide does not smoothly proceed, DC resistance increases, and thus high output is not obtained.

An object of the present invention is to provide an anode with which the output of a solid oxide fuel cell can be increased, a method for producing the anode, and an electrolyte layer-electrode assembly for a fuel cell.

Solution to Problem

An aspect of the present invention relates to a method for producing an anode for a solid oxide fuel cell, the method including a first step of shaping a mixture that contains a perovskite oxide having proton conductivity and a nickel compound; and a second step of firing a shaped product, which has been obtained in the first step, in an atmosphere containing 50% by volume or more of oxygen at 1100° C. to 1350° C. so as to generate an anode.

Another aspect of the present invention relates to an anode for a solid oxide fuel cell, obtained by the method described above.

Yet another aspect of the present invention relates to a method for producing an electrolyte layer-electrode assembly for a fuel cell, the electrolyte layer-electrode assembly including a solid electrolyte layer and an anode that supports the solid electrolyte layer, the method including:

a step A of shaping a mixture of a perovskite oxide having proton conductivity and nickel oxide;

a step B of forming a coating film on one of main surfaces of a shaped product, which has been obtained in the step A, by using a paste that contains a perovskite oxide having proton conductivity; and a step C of firing the shaped product with the coating film thereon in an atmosphere containing 50% by volume or more of oxygen at 1100° C. to 1350° C. so as to generate the anode from the shaped product and the solid electrolyte layer from the coating film and integrate the anode and the solid electrolyte layer.

Advantageous Effects of Invention

According to the present invention, an increase in reaction resistance and/or DC resistance is suppressed and output of a solid oxide fuel cell can be increased.

DESCRIPTION OF EMBODIMENTS

Description of Embodiments of the Present Invention

First, features of the embodiments of the present invention are listed.

(1) A first embodiment of the present invention relates to a method for producing an anode for a solid oxide fuel cell, the method including a first step (shaping step) of shaping a mixture that contains a perovskite oxide having proton conductivity and a nickel compound; and a second step (main firing step) of firing a shaped product, which has been obtained in the first step, in an atmosphere containing 50% by volume or more of oxygen at 1100° C. to 1350° C. so as to generate an anode.

In order to form a solid electrolyte by using a perovskite oxide, sintering needs to be performed at high temperature. However, when a mixture of a perovskite oxide and a nickel compound is sintered at high temperature in preparing an anode containing a solid electrolyte and a nickel component, the nickel compound aggregates and the triple phase boundary decreases. In contrast, if the mixture is fired at low temperature, aggregation of the nickel compound is suppressed by some extent. However, sintering of the perovskite oxide and the nickel compound does not proceed smoothly and the DC resistance of the anode increases.

According to an embodiment of the present invention, in firing the mixture of a perovskite oxide and a nickel compound, firing is performed at a temperature of 1100° C. to 1350° C., which is lower than in related art. Thus, aggregation of the nickel compound can be suppressed and an increase in reaction resistance due to a decrease in the triple phase boundary can be suppressed. Moreover, since the mixture is fired in an oxygen rich atmosphere that contains 50% by volume or more of oxygen, sintering (co-sintering) of the perovskite oxide and the nickel compound proceeds smoothly despite a relatively low firing temperature. As a result, the increase in DC resistance of the anode can be suppressed.

Thus, when the anode obtained in this embodiment is used, the output of the solid oxide fuel cell can be increased. The anode obtained through the production method according to an embodiment of the present invention is used in a protonic ceramic fuel cell (PCFC).

(2) The perovskite oxide preferably has an $AXO_3$ crystal structure, where A sites contain Ba and X sites contain Ce and Y. When such an oxide is used, proton conductivity can be obtained even when the temperature range is relatively low, namely, about 400° C. to 600° C., and this is advantageous in decreasing the operation temperature of the fuel cell.

(3) The volume ratio (=nickel compound/perovskite oxide) of the nickel compound to the perovskite oxide in the mixture is preferably 50/50 to 75/25. When the volume ratio is within this range, aggregation of the nickel compound can be further easily suppressed.

(4) In the second step, the shaped product is preferably fired in an atmosphere that contains 80% by volume or more of oxygen at 1200° C. to 1350° C. In this manner, sintering of the oxide and the nickel compound proceeds smoothly and the effect of suppressing aggregation of the nickel compound can be further enhanced.

(5) The mixture may further contain a binder. Also, the production method described above can further include, after the first step and before the second step, a step of removing the binder (debinding step) by heating the shaped product at a temperature 450° C. or higher and lower than 800° C. In this manner, the shapability of the mixture can be enhanced and since the binder remains little in the anode due to the debinding step, degradation of the anode performance can be suppressed.

(6) The production method described above may further include, before the first step and after the second step, a step (calcining step) of calcining the shaped product at a temperature of 800° C. or higher and lower than 1100° C. Performing calcining before the main firing step (second step) can further increase the extent of sintering of the oxide and the nickel compound.

(7) Another embodiment of the present invention relates to an anode for a solid oxide fuel cell obtained by the above-described production method. According to this anode, aggregation of the nickel compound is suppressed and the extent of sintering of the perovskite oxide and the nickel compound is high. Thus, the increase in reaction resistance and/or DC resistance is suppressed and the output of the fuel cell can be increased.

(8) Yet another embodiment of the present invention relates to a method for producing an electrolyte layer-electrode assembly for a fuel cell, the electrolyte layer-electrode assembly including a solid electrolyte layer and an anode that supports the solid electrolyte layer. The method includes:

a step A of shaping a mixture of a perovskite oxide having proton conductivity and nickel oxide;

a step B of forming a coating film on one of main surfaces of a shaped product, which has been obtained in the step A, by using a paste that contains a perovskite oxide having proton conductivity; and a step C of firing the shaped product with the coating film thereon in an atmosphere containing 50% by volume or more of oxygen at 1100° C. to 1350° C. so as to generate the anode from the shaped product and the solid electrolyte layer from the coating film and integrate the anode and the solid electrolyte layer. According to this embodiment, an electrolyte layer-electrode assembly (anode-supported solid electrolyte layer) that can increase the output of the solid oxide fuel cell can be obtained.

Details of the Embodiments of the Present Invention

Specific examples of the embodiments of the present invention will now be described with reference to the drawings. The present invention is not limited by these illustrative examples but by the scope of the attached claims and inclusion of all modifications within the meaning and scope of the claims and equivalents thereof is intended.

Method for Producing an Anode for a Solid Oxide Fuel Cell

The anode can be formed by performing the first step (shaping step) and the second step (main firing step). If needed, a step of removing a binder (debinding step) and/or a calcining step may be conducted after the first step and before the second step. If both the debinding step and the calcining step are to be performed, the calcining step is preferably performed after the debinding step. Each of the steps will now be specifically described.

(First Step (Shaping Step))

In the shaping step, a mixture containing a perovskite oxide and a nickel compound is given a particular shape. Mixing and shaping can be performed by known methods. The shape of the shaped product can be determined according to the fuel cell and may be, for example, a pellet shape, a plate shape, or a sheet shape.

The perovskite oxide used is one having proton conductivity. For example, known materials used in anodes of fuel cells can be used. A perovskite oxide has an $AXO_3$ crystal structure (an $AXO_{3-\delta}$ crystal structure, where $\delta$ represents an oxygen vacancy concentration, is also included), A sites preferably contain Ba and X sites preferably contain at least one selected from the group consisting of Ce, Zr, and Y. An $AXO_3$ crystal structure is a crystal structure similar to $CaTiO_3$. The A-site element has a larger ionic radius than the X-site elements.

Specific examples of the perovskite oxide include BZY ($BaZr_{1-x1}Y_{x1}O_{3-\delta}$, $0<x1\leq0.5$), BCY ($BaCe_{1-x2}Y_{x2}O_{3-\delta}$, $0<x2\leq0.5$), and BZCY ($BaZr_{1-x3-y1}Ce_{x3}Y_{y1}O_{3-\delta}$, $0.5<x3<1$, $0<y1\leq0.5$). These oxides can be used alone or in combination. Some of Ce, Zr, and/or Y atoms that occupy the X sites may be replaced by another element (for example, another lanthanoid element). Among these perovskite oxides, one that contains Ba in the A sites and Ce and Y in the X sites is preferable. In particular, BCY is preferable.

In the perovskite oxides described above, the oxygen vacancy concentration may be $0 \leq \delta \leq 0.15$ or $0 \leq \delta \leq 0.11$.

Examples of the nickel compound that can be used include hydroxides, salts (inorganic acid salts such as carbonates), and halides. Oxides of nickel, such as nickel oxide (NiO), are preferable. These nickel compounds can be used alone or in combination.

The volume ratio (=nickel compound/perovskite oxide) of the nickel compound to the perovskite oxide in the mixture can be selected from the range of 40/60 to 80/20, for example, is preferably selected from the range of 50/50 to 75/25, and is more preferably selected from the range of 55/45 to 70/30. When the volume ratio is within such a range, the extent of sintering can be easily increased while effectively suppressing aggregation of the nickel compound during firing.

The mixture may contain, if needed, metal compounds other than the perovskite oxide and the nickel compound, for example, compounds (oxides and/or carbonates) of metals of groups 2 to 4 in the periodic table, such as barium oxide, barium carbonate, cerium oxide, zirconium oxide, and yttrium oxide. These metal compounds can be used alone or in combination.

The mixture may further contain a binder. A binder enhances the shapability of the mixture. Examples of the binder include materials known to be used in electrodes of fuel cells. Examples thereof include polymer binders such as cellulose derivatives (cellulose ethers) such as ethyl cellulose, vinyl acetate resins (including saponified vinyl acetate resins such as polyvinyl alcohol), and acrylic resins; and waxes such as paraffin wax. The amount of the binder relative to a total amount, 100 parts by mass, of the perovskite oxide and the nickel compound may be 1 to 15 parts by mass or 3 to 10 parts by mass, for example.

If needed, the mixture can contain a dispersion medium such as water and/or an organic solvent (e.g., hydrocarbons such as toluene; alcohols such as ethanol and isopropanol; and carbitols such as butyl carbitol acetate). The mixture may contain additives, such as a surfactant and/or a deflocculant (such as polycarboxylic acid), if needed.

In the shaping step, the mixture prepared by mixing these materials may be granulated as needed and then shaped. If needed, the granules may be disintegrated and then shaped.
(Debinding Step)

When a mixture containing a binder is shaped in the shaping step, the binder remaining in the shaped product is preferably removed by performing a debinding step. Removing the binder can suppress degradation of anode performance.

In the debinding step, the binder is removed by heating the shaped product. In the debinding step, heating may be performed at a temperature at which the binder can be removed by pyrolysis or the like while aggregation of the nickel compound is prevented (preferably at a temperature at which sintering of the perovskite oxide and the nickel compound does not proceed). The heating temperature can be selected according to the type of the binder and the like and may be, for example, 450° C. or higher, 500° C. or higher, or 700° C. or higher. The heating temperature is preferably lower than the temperature of the calcining and/or the temperature of the main firing and may be, for example, lower than 800° C.
(Calcining step)

In the calcining step, the shaped product obtained in the shaping step or the debinding step is calcined prior to the main firing step. The calcining step can be performed at a temperature lower than the temperature of the main firing step. When the debinding step is performed, the temperature of the calcining is preferably higher than the temperature of the debinding step. Handling and/or workability in the subsequent steps can be improved by performing the calcining step.

The temperature of the calcining is preferably 800° C. or higher and lower than 1100° C. or can be 900° C. to 1050° C.

The calcining may be performed in air, or, as in the case of the main firing step, in an oxygen-rich atmosphere. The oxygen content in the calcining atmosphere may be selected from the same range as the oxygen content range for the main firing step.

Calcining may be conducted at a normal pressure or a high pressure.
(Second Step (Main Firing Step))

In the main firing step, the shaped product obtained in the shaping step (or the debinding step or calcining step) is fired. During this process, it is important to fire the shaped product at a relatively low temperature in an oxygen-rich atmosphere. When firing is performed under such conditions, the extent of sintering of the perovskite oxide and the nickel compound can be increased while suppressing aggregation of the nickel compound.

The main firing is performed in an atmosphere that contains 50% by volume or more of oxygen. The oxygen content in the atmosphere for the main firing is preferably 80% by volume or more or may be 90% by volume or more. The oxygen content in the atmosphere is 100% by volume or less. The main firing is preferably conducted in an atmosphere with an oxygen content of 100% by volume. When the main firing is performed in an oxygen rich atmosphere as such, the perovskite oxide and the nickel compound can be effectively sintered despite firing at low temperature. The balance of the atmosphere for the main firing is, for example, inert gas such as nitrogen or argon, or air (or a constitutional component of air).

The temperature for the main firing is 1100° C. to 1350° C., preferably 1200° C. to 1350° C., and more preferably 1250° C. to 1350° C. When the temperature for the main firing is lower than 1100° C., the extent of sintering is insufficient and DC resistance is increased. When the temperature of the main firing is higher than 1350° C., aggregation of the nickel compound becomes extensive. In either case, it is difficult to increase the output.

The main firing can be conducted at a normal pressure or a high pressure.

As described above, an anode is formed through the first step and the second step (if needed, the debinding step and/or the calcining step is also performed).

The obtained anode has a porous structure in which a complex oxide of a perovskite oxide (solid electrolyte material) and nickel oxide (NiO) serving as a catalyst component and the like are formed. Such an anode is used as the anode of a solid oxide fuel cell (in particular, PCFC). The anode mounted in the fuel cell oxidizes the supplied fuel, such as hydrogen, so that the reaction of releasing protons and electrons (oxidation reaction of fuel) can be conducted.

In the anode obtained by such a production method, aggregation of the nickel compound is suppressed compared to the anodes of related art and thus the particle size of the generated nickel oxide is small and nickel oxide is more evenly dispersed in the anode. Thus, the triple phase boundary in the anode can be increased and the increase in reaction resistance can thereby suppressed.

According to the embodiment described above, the average particle size of nickel oxide in the anode can be decreased to such a low level as, for example, 0.5 to 3 μm or 0.5 to 2 μm.

The average particle size of nickel oxide can be calculated by, for example, taking a SEM photograph of a section of an anode, measuring the diameters of equivalent circles (circles having the same areas as the cross sections of the particles) of sections of multiple (for example, 50) nickel oxide particles included within a region with a particular area, and averaging the results. Alternatively, the average particle size of nickel oxide can be estimated by using a SEM photograph of the anode section after reduction of nickel oxide contained in the anode into Ni. Specifically, in a SEM photograph of an anode section after reduction, the outer contours of nickel particles and voids that surround the nickel particles (voids formed by removal of oxygen by reduction) can be deem to constitute the shapes of the former nickel oxide. For such nickel particles and the voids surrounding them, diameters of the equivalent circles of the sections may be measured and the diameters measured at multiple positions (for example, 50 positions) may be averaged to determine the average particle size of the nickel oxide. The average calculated as such is not much different from the average value determined from the equivalent circle diameters of the sections of the nickel oxide described above and can be considered as the average particle size of nickel oxide.

The thickness of the anode can be appropriately determined within the range of 10 μm to 2 mm, for example, or may be 10 to 100 μm. The thickness of the anode may be increased so that the anode can also function as a support that supports the solid electrolyte layer. In such a case, the thickness of the anode can be appropriately selected from the range of 100 μm to 2 mm.

Method for Producing Electrolyte Layer-Electrode Assembly

In a production method according to another embodiment of the present invention, an electrolyte layer-electrode assembly (hereinafter may be simply referred to as an assembly) that includes a solid electrolyte layer and an anode that supports the solid electrolyte layer is produced.

The method for producing the assembly includes the step A (shaping step), the step B (coating film forming step), and the step C (main firing step) described above. The step A and the step C respectively correspond to the first step (shaping step) and the second step (main firing step) of the method for producing an anode mentioned above. After the step A and before the step C, a debinding step of removing the binder and/or a calcining step may be included. The debinding step may be performed between the step A and the step B and/or between the step B and the step C. The calcining step can be performed between the step A and the step B and/or between the step B and the step C, and is preferably performed between the step A and the step B. In the description below, each step is described in further detail.

(Step A (Shaping Step))

The shaping step is the same as the first step (shaping step) of the method for producing an anode mentioned above and thus the description of the first step can be cited here.

(Debinding Step (First Debinding Step))

When a mixture containing a binder is shaped in the shaping step, the binder remaining in the shaped product is preferably removed by performing a debinding step (first debinding step). The first debinding step is the same as the debinding step of the method for producing an anode and thus the description of the debinding step mentioned above can be cited here.

Even when a mixture containing a binder is used in the shaping step, there is no need to perform a debinding step (first debinding step) between the shaping step and the coating film forming step and a debinding step (second debinding step) may be performed between the coating film forming step and the main firing step.

(Calcining Step)

In the calcining step, the shaped product obtained in the shaping step or the first debinding step is calcined. The calcining step can be performed under the conditions described in the calcining step of the method for producing an anode. When a calcining step is performed, handling and/or workability in the subsequent steps can be improved.

(Step B (Coating Film Forming Step))

In the coating film forming step, a coating film which is a precursor of a solid electrolyte layer is formed on the shaped product obtained in the shaping step, first debinding step, or calcining step. The coating film can be formed by applying to one of main surfaces of the shaped product a paste that contains a perovskite oxide having proton conductivity. The coating film can be formed by a known method that uses a known coater or screen printing.

The perovskite oxide to be contained in the paste can be appropriately selected from those examples described in the first step. The perovskite oxide used in the coating film forming step may be the same perovskite oxide used in the mixture in the shaping step, or may be a different perovskite oxide. Using the same oxide is advantageous suppressing warpage or separation because the thermal expansion coefficient of the anode and the thermal expansion coefficient of the solid electrolyte layer during firing can be adjusted to be close to each other.

The paste may further contain a metal compound selected from examples described for the first step.

The paste may further contain a binder. The binder may be appropriately selected from examples described in the first step. The amount of the binder may be, for example 10 to 300 parts by mass or 100 to 200 parts by mass relative to 100 parts by mass of the perovskite oxide.

The paste can contain a dispersion medium such as water and/or an organic solvent (examples of which are described in the first step), if needed. The paste may contain additives such as a surfactant and/or a deflocculant (polycarboxylic acid or the like), if needed.

After formation of the coating film, the shaped product with the coating film thereon may be dried as needed.

The coating weight of the paste can be appropriately adjusted so that the thickness of the solid electrolyte layer obtained by firing the coating film is, for example, in the range of 1 to 50 μm and preferably 3 to 20 μm. When the thickness of the solid electrolyte layer is within this range, the resistance of the solid electrolyte layer is suppressed to a low level, which is preferable.

(Debinding Step (Second Debinding Step))

When the binder is contained in the coating film a debinding step (second debinding step) of removing the binder is preferably performed after the coating film forming step and before the main firing step from the viewpoint of suppressing degradation of performance of the solid electrolyte layer. When a binder is used in the shaping step and the first debinding step is not performed, the binder remaining in the coating film as well as the binder remaining in the shaped product can be removed by performing the second debinding step; furthermore, degradation of the anode performance can be suppressed.

The conditions for the second debinding step can be appropriately set according to the type of the binder contained in the coating film and/or the type of the binder contained in the shaped product. More specifically, the debinding process can be performed by appropriately selecting the conditions from among the conditions described in the debinding step of the method for producing an anode.
(Step C (Main Firing Step))

In the main firing step, the shaped product with the coating film thereon obtained in the coating film forming step or the second debinding step is fired at a relatively low temperature in an oxygen-rich atmosphere. Due to the main firing step, the shaped product is converted into an anode and the coating film is converted into a solid electrolyte layer. As a result, an assembly in which the anode and the solid electrolyte layer are integrated is obtained.

The main firing step can be performed by appropriately referring to the conditions described in relation with the main firing step (second step) of the method for producing an anode. The solid electrolyte layer formed in the main firing step has a function of conducting only protons generated in the anode to the cathode in a fuel cell.

Figure 1:
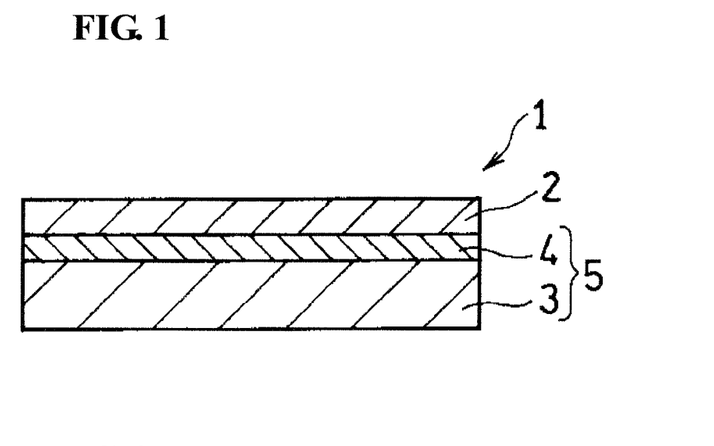
FIG. 1 is a schematic cross-sectional view of a cell structure that includes an anode or electrolyte layer-electrode assembly obtained by a production method according to one embodiment of the present invention.

FIG. 1 is a schematic cross-sectional view of a cell structure that includes an anode or assembly obtained in the production method according to an embodiment of the present invention.

The cell structure 1 includes a cathode 2, an anode 3, and a solid electrolyte layer 4 disposed therebetween. The anode 3 and the solid electrolyte layer 4 are integrated to form an electrolyte layer-electrode assembly 5.

The thickness of the anode 3 is larger than the thickness of the cathode 2 and the anode 3 serves as a support that supports the solid electrolyte layer 4 (therefore the cell structure 1). The example illustrated in the drawing is not limiting. The thickness of the anode 3 is not necessarily larger than the thickness of the cathode 2. For example, the thickness of the anode 3 may be about the same as the thickness of the cathode 2.

When the anode 3 or the assembly 5 is produced by the production method according to an embodiment of the present invention, the reaction resistance and/or DC resistance of the anode 3 is prevented from increasing and the output of the fuel cell can be increased.

Figure 2:
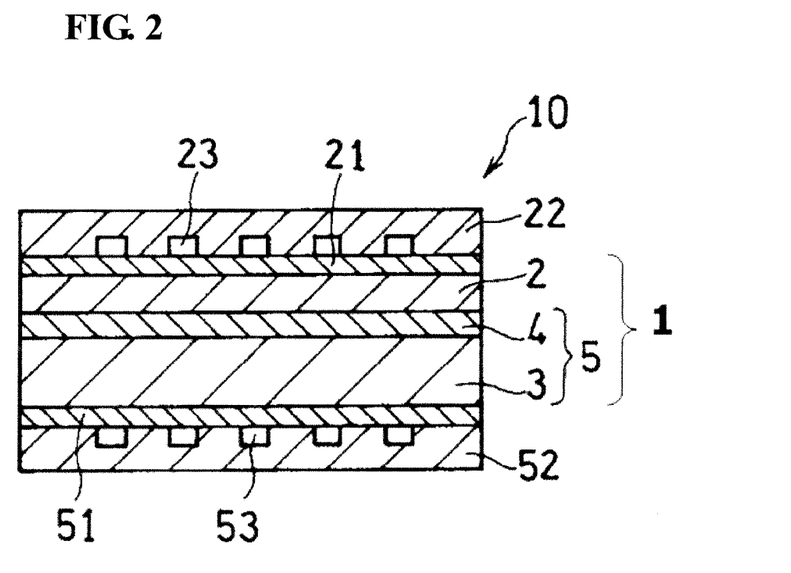
FIG. 2 is a schematic cross-sectional view of a fuel cell that includes the cell structure illustrated in FIG. 1.

FIG. 2 is a schematic cross-sectional view of a fuel cell (solid oxide fuel cell) that includes the cell structure illustrated in FIG. 1.

A fuel cell 10 includes the cell structure 1, a separator 22 that includes an oxidant channel 23 through which an oxidant is supplied to the cathode 2 of the cell structure 1, and a separator 52 that includes a fuel channel 53 through which a fuel is supplied to the anode 3. In the fuel cell 10, the cell structure 1 is sandwiched between the cathode-side separator 22 and the anode-side separator 52.

The oxidant channel 23 of the cathode-side separator 22 is arranged to face the cathode 2 of the cell structure 1. The fuel channel 53 of the anode-side separator 52 is arranged to face the anode 3.

The oxidant channel 23 includes an oxidant inlet through which an oxidant flows in and an oxidant outlet through which water generated by reaction, an unused oxidant, etc., are discharged (neither is illustrated in the drawing). An example of the oxidant is oxygen-containing gas. The fuel channel 53 includes a fuel gas inlet through which fuel gas flows in and a fuel gas outlet through which unused fuel and $H_2O$, $N_2$, $CO_2$, etc., generated by reaction are discharged (neither is illustrated in the drawing). Examples of the fuel gas include gas that contains hydrogen, methane, ammonia, and carbon monoxide gas.

The fuel cell 10 may further include a cathode-side current collector 21 disposed between the cathode 2 and the cathode-side separator 22 and an anode-side current collector 51 disposed between the anode 3 and the anode-side separator 52. The cathode-side current collector 21 has, in addition to the current collecting function, a function of diffusing the oxidant gas introduced through the oxidant channel 23 into the cathode 2 so as to supply the oxidant gas to the cathode 2. The anode-side current collector 51 has, in addition to the current collecting function, a function of diffusing the fuel gas introduced through the fuel channel 53 into the anode 3 so as to supply the fuel gas to the anode 3. In this respect, each current collector preferably has a sufficiently air-permeable structure. The current collectors 21 and 51 are not essential components of the fuel cell 10.

Since the fuel cell 10 contains a proton-conductive solid electrolyte, the fuel cell 10 can operate in an intermediate temperature range of lower than 700° C., preferably in the range of about 400° C. to 600° C.
(Cathode)

The cathode has a porous structure capable of adsorbing and ionizing oxygen molecules. At the cathode 2, the reaction between oxide ions and protons delivered through the solid electrolyte layer 4 (oxygen reduction reaction) takes place. The oxide ions are generated as a result of ionization of the oxidant (oxygen) introduced through the oxidant channel.

The material for the cathode can be, for example, a material known to be used in cathodes of fuel cells. In particular, compounds that contain lanthanum and have a perovskite structure (for example, ferrite, manganite, and/or cobaltite) are preferable. Among such materials, ones that further contain strontium are more preferable. Specific examples thereof include lanthanum strontium cobalt ferrite (LSCF, $La_{1-x4}Sr_{x4}Fe_{1-y2}CO_{y2}O_{3-\delta}$, $0<x4<1$, $0<y2<1$, $\delta$=oxygen vacancy concentration), lanthanum strontium manganite (LSM, $La_{1-x5}Sr_{x5}MnO_{3-\delta}$, $0<x5<1$, $\delta$=oxygen vacancy concentration), and lanthanum strontium cobaltite (LSC, $La_{1-x6}Sr_{x6}CoO_{3-\delta}$, $0<x6\le1$, $\delta$=oxygen vacancy concentration).

For these perovskite oxides, the oxygen vacancy concentration $\delta$ may be $0\le\delta\le0.15$ or $0\le\delta\le0.11$.

From the viewpoint of accelerating the reaction between protons and the oxide, the cathode 2 may contain a catalyst such as Pt. A cathode 2 containing a catalyst can be formed by mixing a catalyst to the above-described materials and sintering the resulting mixture. The thickness of the cathode 2 is not particularly limited and may be about 5 to 40 μm.

The cathode can be formed by a known method. The cathode may be prepared by a method similar to the method for producing an anode. In preparing a cathode, if needed, a binder, an additive, and/or a dispersion medium may be used as in the case of preparing an anode. These components may be appropriately selected from the examples described in relation with the anode.

If needed, a buffer layer may be formed between the cathode 2 and the solid electrolyte layer 4.
(Separator)

When two or more cell structures are stacked to form a fuel cell, for example, a cell structure 1, a cathode-side separator 22, and an anode-side separator 52 are stacked to constituted one unit. The two or more cell structures 1 may be connected to one another in series through separators equipped with gas channels (oxidant channels and fuel channels) on both sides, for example.

Examples of the material for the separators include heat-resistant alloys such as stainless steel, nickel-based alloys, and chromium-based alloys from the viewpoint of electrical conductivity and heat resistance. Examples of the alloys include. Among these, stainless steel is preferable for its low cost. Since the operation temperature of PCFC is about 400° C. to 600° C., stainless steel can be used as the material for the separators.

(Current Collector)

Examples of the structures used as the cathode-side current collector and the anode-side current collector include metal porous bodies, metal meshes, punching metals, and expanded metals that contain silver, silver alloys, nickel, nickel alloys, etc. Among these, metal porous bodies are preferable due to their light-weightiness and air permeability. In particular, a metal porous body having a three-dimensional network structure is preferable. A three-dimensional network structure refers to a structure in which rod-shaped or fibrous metals that constitute the metal porous body are three-dimensionally interconnected to form a network structure. Examples thereof include sponge-like structures and non-woven fabric structures.

A metal porous body can be formed by coating a resin porous body having continuous pores with a metal such as one described above. After the metal coating process, the resin inside is removed so as to form voids inside the skeleton of the metal porous body, thereby giving a hollow structure. An example of a commercially available metal porous body having such a structure is nickel "Celmet" produced by Sumitomo Electric Industries, Ltd.

A fuel cell can be produced by a known method while using an anode or an electrolyte-electrode assembly obtained by the production method described above.

EXAMPLES

The present invention will now be specifically described by using Examples and Comparative Examples, which do not limit the scope of the present invention.

Example 1

(1) Preparation of Cell Structure

A cell structure was prepared through the following procedure:

BCY ($BaCe_{0.8}Y_{0.2}O_{3-\delta}$ ($\delta \approx 0.1$)) and NiO were mixed with a binder (Celuna WF-804 and Celuna WF-610 produced by CHUKYO YUSHI CO., LTD.), an additive (Celuna D-305 produced by CHUKYO YUSHI CO., LTD.), and an appropriate amount of ethanol and the resulting mixture was granulated. The volume ratio of BCY to NiO was 40:60. The amount of the binder and the amount of the additive relative to a total of 100 parts by mass of BCY and NiO were 7.00 parts by mass and 0.54 parts by mass, respectively. The granules obtained were shaped into a disk-shaped pellet by using a die having a diameter of 22 mm at a force of 20 kN.

The pellet was heated at 750° C. for 10 hours to perform a debinding process. The resulting pellet was calcined by being heated at 1000° C. for 10 hours.

A paste containing BCY ($BaCe_{0.8}Y_{0.2}O_{3-\delta}$ ($\delta \approx 0.1$)), ethyl cellulose (binder), a surfactant (KAOCER 8110 produced by Kao Corporation), and an appropriate amount of butyl carbitol acetate was applied to one of the main surfaces of the calcined pellet by screen printing so as to form a coating film. The amount of the binder and the amount of the surfactant relative to 100 parts by mass of BCY were 152.3 parts by mass and 1.52 parts by mass, respectively.

The pellet with the coating film thereon was heated at 750° C. for 10 hours to remove the binder contained in the coating film. The pellet with the coating film after binder removal was heated in a 100 vol % oxygen atmosphere at 1300° C. for 10 hours to perform main firing. As a result, an electrolyte layer-electrode assembly in which a solid electrolyte layer was integrally formed on one of the main surfaces of the anode was obtained. The thickness of the solid electrolyte layer of the obtained assembly measured with a SEM was 10 μm. The total thickness of the anode and the solid electrolyte layer measured with a vernier caliper was about 1.4 mm.

A cathode paste that contained powder of LSCF ($La_{0.6}Sr_{0.4}Fe_{0.8}Co_{0.2}O_{3-\delta}$ ($\delta \approx 0.1$)), a surfactant (MALIALIM™ produced by NOF Corporation), and an appropriate amount of a solvent (toluene and isopropanol) was prepared. The cathode paste was applied to a surface of the solid electrolyte layer of the obtained assembly and heated at 1000° C. for 2 hours to form a cathode (thickness: 10 μm). As a result, a cell structure was formed.

(2) Preparation of Fuel Cell

A platinum paste was applied to surfaces of the cathode and the anode of the cell structure obtained as above and platinum meshes were attached to form current collectors. A cathode-side separator composed of stainless steel and equipped with an oxidant channel was stacked on the cathode-side current collector. An anode-side separator composed of stainless steel and equipped with a fuel channel was stacked on the anode-side current collector so as to prepare a fuel cell 10 illustrated in FIG. 2.

(3) Evaluation

During preparation of the cell structure described above, a SEM photograph of a surface of the solid electrolyte layer formed was taken before formation of the cathode. The cell structure obtained as above was used to determine the output density, the average particle size of the nickel compound, and the reaction resistance through the procedures below.

(a) Output Density

The cell structure was hydrated in a 600° C. humidified atmosphere for 24 hours. The cell structure after hydration was used to measure the output density while varying the current density and the maximum value of the output density was determined.

(b) Average Particle Size of Nickel Compound

A SEM photograph of a section of the anode in the cell structure after measurement of the output density described in (a) above was taken. The anode was in a state in which NiO was reduced to Ni and voids were formed due to oxygen removed by reduction. In the SEM photograph of the section, the outer contours of the Ni particles and the surrounding void portions were assumed to be the contours of the NiO particles and the diameter of equivalent circle of each contour was measured at 50 positions selected at random. The results were averaged to determine the average particle size of the nickel compound. According to the result, the average particle size of NiO was 1.5 μm in Example 1.

(c) Reaction Resistance

An AC impedance was measured under open circuit conditions at operation temperatures of 500° C., 600° C., and 700° C. so as to determine the DC resistance of the entire cell structure. During this process, a current value and a voltage value at a cell voltage about 0.2 V lower than the open circuit voltage were determined and the total resistance of the cell structure was determined from these current value and voltage value. The DC resistance of the entire cell structure was subtracted from the total resistance of the cell structure to determine the reaction resistance of the entire cell structure.

Comparative Example 1

A cell structure and a fuel cell were prepared as in Example 1 except that main firing was performed at a temperature of 1400° C. in air. Evaluation of output density was conducted as in Example 1. According to the result, the average particle size of NiO was 3.3 μm.

Example 2

A cell structure and a fuel cell were prepared as in Example 1 except that the mixing ratio of BCY to NiO was changed to 30:70 (volume ratio). Evaluation of output density and average particle size was conducted as in Example 1.

The results of Examples and Comparative Example are shown in Table 1. Examples 1 and 2 are A1 and A2. Comparative Example 1 is B1.

TABLE 1

| | NiO (vol %) | Main firing temperature (° C.) | $O_2$ (vol %) | Output density (mW/cm$^2$) 600° C. | Reaction resistance ($\Omega$cm$^2$) 500° C. | 600° C. | 700° C. |
|---|---|---|---|---|---|---|---|
| A1 | 60 | 1300 | 100 | 664 | 0.52 | 0.23 | 0.10 |
| A2 | 70 | 1300 | 100 | 533 | 0.65 | 0.30 | 0.18 |
| B1 | 60 | 1400 | Approximately 20 | 393 | 2.94 | 0.54 | 0.12 |

As shown in Table 1, the reaction resistance was low and output was high in Examples compared to Comparative Example.

Figure 3:
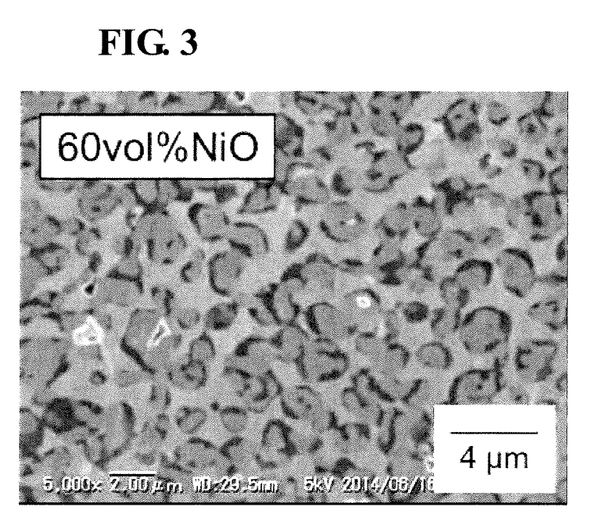
FIG. 3 is a scanning electron microscope (SEM) photograph of a section of an anode (after reduction) of Example 1.
Figure 4:
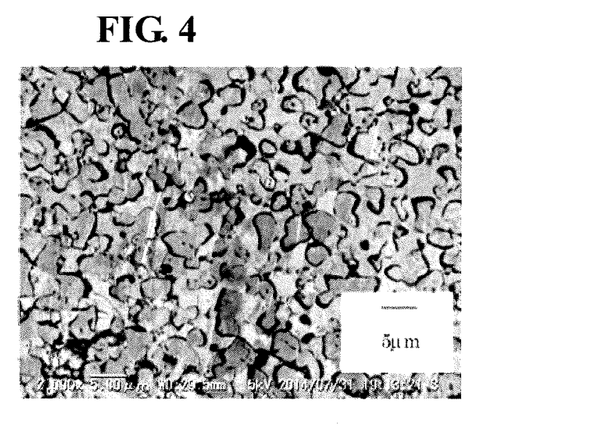
FIG. 4 is a SEM photograph of a section of an anode (after reduction) of Comparative Example 1.

FIGS. 3 and 4 are SEM photographs of sections of the anodes formed in Example 1 and Comparative Example 1, respectively. As shown in these photographs, the nickel compound has small particle size and aggregation of the nickel compound is suppressed in Example 1 compared to Comparative Example 1.

Figure 5:
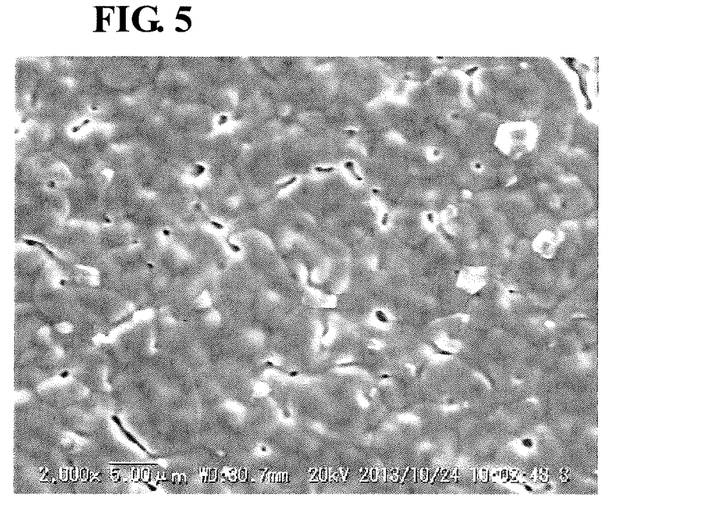
FIG. 5 is a SEM photograph of a surface of a solid electrolyte layer of Example 1.
Figure 6:
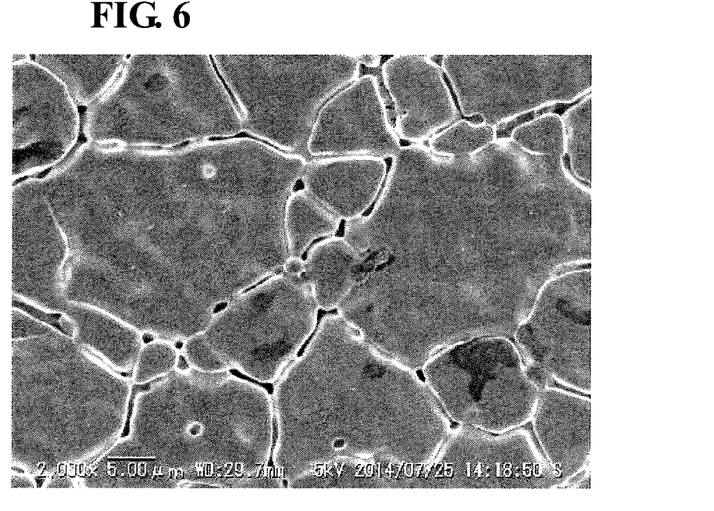
FIG. 6 is a SEM photograph of a surface of a solid electrolyte layer of Comparative Example 1.

FIGS. 5 and 6 are SEM photographs of surfaces of solid electrolyte layers formed in the process of producing a cell structure in Example 1 and Comparative Example 1, respectively. As shown in these photographs, a dense and homogeneous solid electrolyte layer is formed in Example compared to Comparative Example. This is presumably because aggregation of nickel in the anode has been suppressed.

In Examples described above, the results obtained when the oxygen concentration is 100% and the main firing temperature is 1300° C. are described. However, the results similar to or the same as those of Examples 1 and 2 are obtained as long as the oxygen concentration is 50% to 100% and the main firing temperature is in the range of 1100° C. to 1350° C. From the viewpoint of increasing the extent of sintering, the oxygen concentration is more preferably 80% to 100% and the main firing temperature is more preferably 1200° C. to 1350° C.

INDUSTRIAL APPLICABILITY

An anode and an electrolyte layer-electrode assembly obtained by production methods according to embodiments of the present invention offer high output and excellent proton conductivity. Thus, they are suitable for use in intermediate temperature fuel cells (proton conducting fuel cells, PCFC) whose operation temperature is lower than 700° C.

REFERENCE SIGNS LIST

1: cell structure
2: cathode
3: anode
4: solid electrolyte layer
5: electrolyte layer-electrode assembly
10: fuel cell
21, 51: current collector
22, 52: separator
23: fuel channel
53: oxidant channel

The invention claimed is:

1. A method for producing an anode for a solid oxide fuel cell, the method comprising:
   a first step of shaping a mixture that contains a perovskite oxide having proton conductivity and a nickel compound; and
   a second step of firing a shaped product, which has been obtained in the first step, in an atmosphere containing 50% by volume or more of oxygen at 1100° C. to 1350° C. so as to generate an anode.

2. The method for producing an anode for a solid oxide fuel cell according to claim 1, wherein the perovskite oxide has an $AXO_3$ crystal structure where A sites contain Ba and X sites contain Ce and Y.

3. The method for producing an anode for a solid oxide fuel cell according to claim 1, wherein, in the mixture, a volume ratio of the nickel compound to the perovskite oxide is 50/50 to 75/25.

4. The method for producing an anode for a solid oxide fuel cell according to claim 1, wherein, in the second step, the shaped product is fired in an atmosphere containing 80% by volume or more of oxygen at 1200° C. to 1350° C.

5. The method for producing an anode for a solid oxide fuel cell according to claim 1, wherein the mixture further contains a binder, and
   the method further comprises, after the first step and before the second step, a step of removing the binder by heating the shaped product at a temperature of 450° C. or higher and lower than 800° C.

6. The method for producing an anode for a solid oxide fuel cell according to claim 1, further comprising, after the first step and before the second step, a step of calcining the shaped product at a temperature of 800° C. or higher and lower than 1100° C.

7. A method for producing an electrolyte layer-electrode assembly for a fuel ell, the electrolyte layer electrode assembly including a solid electrolyte layer and an anode that supports the solid electrolyte layer, the method comprising:
   a step A of shaping a mixture of a perovskite oxide having proton conductivity and nickel oxide;
   a step B of forming a coating film on one of main surfaces of a shaped product, which has been obtained in the step A, by using a paste that contains a perovskite oxide having proton conductivity; and
   a step C of firing the shaped product with the coating film thereon in an atmosphere containing 50% by volume or more of oxygen at 1100° C. to 1350° C. so as to generate the anode from the shaped product and the solid electrolyte layer from the coating film and integrate the anode and the solid electrolyte layer.

* * * * *

UNITED STATES PATENT AND TRADEMARK OFFICE
CERTIFICATE OF CORRECTION

| | |
|---|---|
| PATENT NO. | : 10,193,161 B2 |
| APPLICATION NO. | : 15/526831 |
| DATED | : January 29, 2019 |
| INVENTOR(S) | : Yohei Noda et al. |

Page 1 of 1

It is certified that error appears in the above-identified patent and that said Letters Patent is hereby corrected as shown below:

In the Claims

Column 14, In Claim 7, Line 54, "ell, the electrolyte layer electrode" should read --cell, the electrolyte layer-electrode--

Signed and Sealed this
Second Day of April, 2019

Andrei Iancu
*Director of the United States Patent and Trademark Office*